US 6,577,653 B1

(12) United States Patent
Rochberger et al.

(10) Patent No.: US 6,577,653 B1
(45) Date of Patent: Jun. 10, 2003

(54) APPARATUS FOR AND METHOD OF ESTABLISHING A ROUTE UTILIZING MULTIPLE PARALLEL SEGMENTS IN AN ASYNCHRONOUS TRANSFER MODE NETWORK

(75) Inventors: Haim Rochberger, Netanya (IL); Sarit Shani Natanson, Tel Aviv (IL); Michael Gorokhovsky, Bat Hefer (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,884

(22) Filed: Apr. 28, 1999

(51) Int. Cl.[7] .................................................. H04J 3/22
(52) U.S. Cl. ...................................... 370/536; 370/542
(58) Field of Search .......................... 370/254, 389, 370/395.1, 356, 238, 397, 394, 536, 542

(56) References Cited

U.S. PATENT DOCUMENTS

| | | | |
|---|---|---|---|
| 4,884,263 A | * 11/1989 | Suzuki | |
| 5,291,477 A | 3/1994 | Liew | 370/54 |
| 5,339,318 A | * 8/1994 | Tanaka et al. | |
| 5,361,256 A | 11/1994 | Doeringer et al. | 370/60 |
| 5,420,862 A | 5/1995 | Perlman | 370/85.13 |
| 5,455,865 A | 10/1995 | Perlman | 380/49 |
| 5,483,536 A | 1/1996 | Gunji et al. | 370/85.14 |
| 5,491,690 A | 2/1996 | Alfonsi et al. | 370/60 |
| 5,495,479 A | 2/1996 | Galaand et al. | 370/60 |
| 5,544,327 A | 8/1996 | Dan et al. | 395/250 |
| 5,550,818 A | 8/1996 | Brackett et al. | 370/60 |
| 5,566,014 A | 10/1996 | Glance | 359/124 |
| 5,590,118 A | 12/1996 | Nederlof | 370/218 |
| 5,600,638 A | 2/1997 | Bertin et al. | 370/351 |
| 5,603,029 A | 2/1997 | Aman et al. | 395/675 |
| 5,617,417 A | * 4/1997 | Sathe et al. | 370/394 |
| 5,629,930 A | 5/1997 | Beshai et al. | 370/396 |
| 5,649,108 A | 7/1997 | Spiegel et al. | 395/200.12 |
| 5,673,263 A | 9/1997 | Basso et al. | 370/396 |
| 5,883,891 A | * 3/1999 | Williams et al. | 370/356 |
| 5,953,338 A | * 9/1999 | Ma et al. | 370/395 |
| 6,002,670 A | * 12/1999 | Rahman et al. | 370/238 |
| 6,205,142 B1 | * 3/2001 | Vallee | 370/394 |
| 6,222,842 B1 | * 4/2001 | Sasyan et al. | 370/397 |
| 6,222,858 B1 | * 4/2001 | Counterman | |

OTHER PUBLICATIONS

Perlman, R., "Interconnections: Bridges and Routers", Addison–Wesley Publishing, Section 9.2.4, Chapter 9, pp. 205–264 (1992).

(List continued on next page.)

*Primary Examiner*—Ken Vanderpuye
(74) *Attorney, Agent, or Firm*—Howard Zaretsky (57) ABSTRACT

An apparatus for and a method of establishing a connection between a source and destination node using multiple parallel paths. To establish a connection, bandwidth capacity on one or more parallel paths are aggregated and combined to form a route having a bandwidth larger than any single path. A technique similar to inverse multiplexing is used at the source end to split the cell stream into multiple parallel paths. At the destination end, the parallel multiple cell streams are inverse demultiplexed and the multiple cell streams combined into a single cell stream. The parallel routes are established by building parallel VCCs for the same call via the network. The ATM signaling process at the source and destination nodes is modified to accommodate multiple VCCs. In addition, the hardware at each source and destination node is configured to perform the inverse and inverse demultiplexing. Further, the control software at the source and destination nodes is modified to implement the call handling required of such a multiple VCC call, including setup, tear down, error handling, etc.

20 Claims, 8 Drawing Sheets

OTHER PUBLICATIONS

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

APPARATUS FOR AND METHOD OF ESTABLISHING A ROUTE UTILIZING MULTIPLE PARALLEL SEGMENTS IN AN ASYNCHRONOUS TRANSFER MODE NETWORK

FIELD OF THE INVENTION

The present invention relates generally to data communications networks and more particularly relates to a method for establishing a route in an Asynchronous Transfer Mode (ATM) network utilizing one or more parallel route segments.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine.

This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels is included in the database summary. The PTSP and PTSE header information of each such PTSE is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network.

Once the topology of the network is learned by all the nodes in the network, routes can be calculated from source to destination users. A routing algorithm commonly used to determine the optimum route from a source node to a destination node is the Dijkstra algorithm. The Dijkstra algorithm is used generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative list to the Path List.

The algorithm begins with the source node (self) as the root of a tree by placing the source node ID onto the Path List. Next, for each node N placed in the Path List, examine N's nearest neighbors. For each neighbor M, add the cost of the path from the root to N to the cost of the link from N to M. If M is not already in the Path List or the Tentative List with a better path cost, add M to the Tentative List.

If the Tentative List is empty, terminate the algorithm. Otherwise, find the entry in the Tentative List with the minimum cost. Move that entry to the Path List and repeat the examination step described above.

Combined Networking Technologies

In modem data communication networks, it is common to find more than one networking technology in use within a given network. More times than not, one finds different networking technologies being used together to implement a larger size network. An example of this is to consider one or more edge devices that implement 10 or 100 Mbps Ethernet or even Gigabit Ethernet. With such as edge device, one can communicate a 10, 100 or 1000 Base-T Ethernet communication signal to a destination via the ATM network.

Using such a combination of mixed technologies, i.e., Ethernet and ATM, it is entirely possible that the edge devices may have an interface to the application or host whose bandwidth capacity is bigger than the corresponding interface to the ATM network. For example, consider a Gigabit Ethernet edge device one the one hand and an OC-3 155 Mbps ATM port connection to the ATM network on the other hand.

Using conventional ATM routing techniques, either IISP or PNNI, if an application requires a route that source to destination with a bandwidth that exceeds any individual path, the setup request will fail as there is no single path that fulfills the large bandwidth constraint. In the example provided above, if the largest path only provides 155 Mbps bandwidth, and the application requests 250 Mbps (only ¼ of Gigabit Ethernet), a route cannot be found and the setup request will fail.

Figure 1:
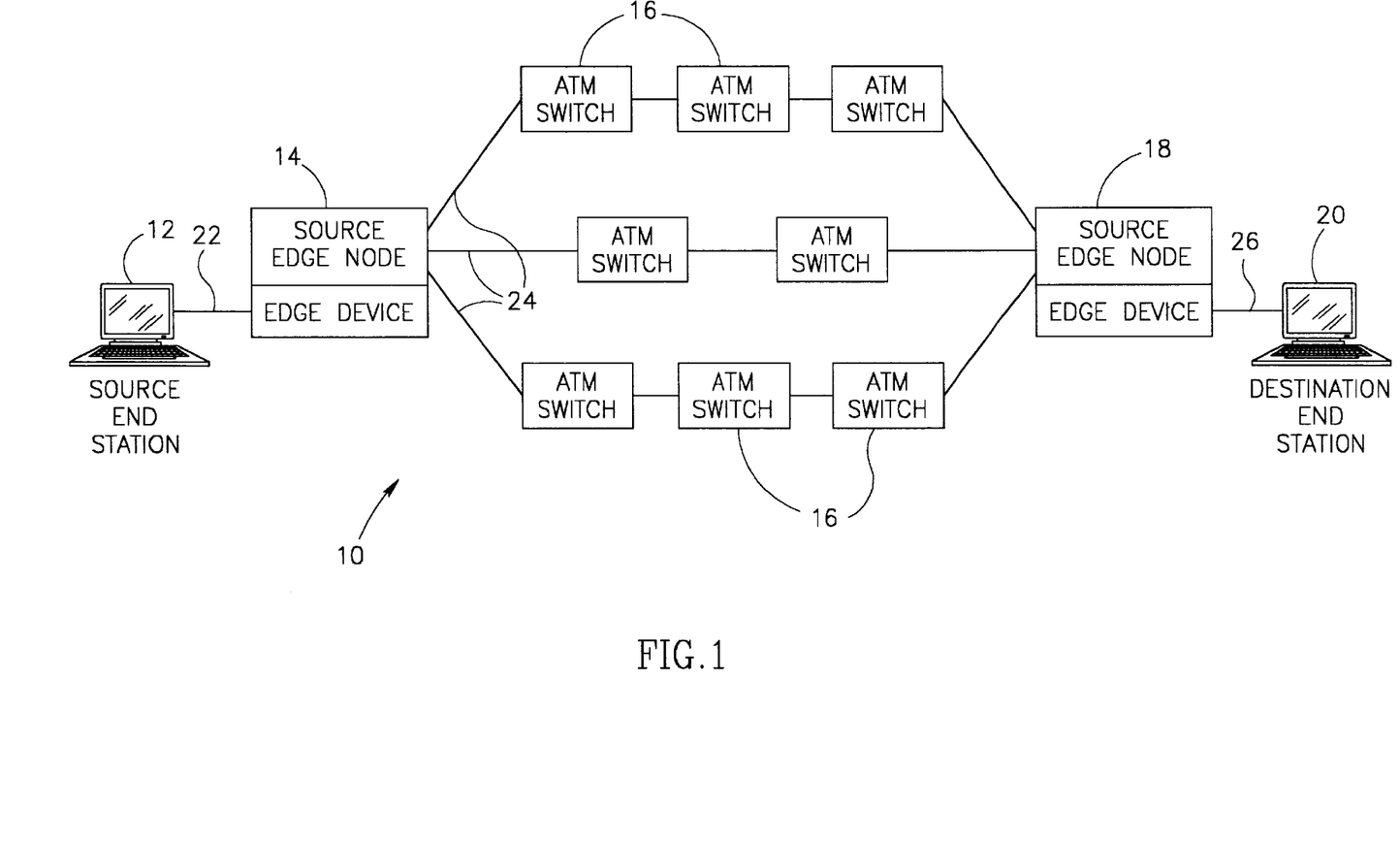
FIG. 1 is a block diagram illustrating an example ATM network having a source and destination edge node connectable via multiple paths.

As another example, consider the ATM network having a source and destination edge node connectable via multiple paths as shown in FIG. 1. The network, generally referenced 10, comprises a source end station 12, edge device/source edge node 14, destination end station 20 and edge device/destination edge node 18.

The source end station is connected to the edge device via a Gigabit Ethernet connection 22. The source edge node 14 is connected to three intermediate ATM switches 16 via 155 Mbps OC-3 uplinks 24. Each of the links connecting the intermediate ATM switches are connected by links with 155 Mbps OC-3 bandwidth capacity. The destination end station is likewise connected to its edge device via Gigabit Ethernet connection 26.

Although the source and destination end stations 12, 20 are connected by Gigabit Ethernet, the largest single path that can be routed using conventional ATM routing techniques is 155 Mbps. If a connection is requested with a bandwidth exceeding the capacity of 155 Mbps, the request cannot be satisfied with this ATM network and the connection request will fail.

SUMMARY OF THE INVENTION

The present invention overcomes the disadvantages of the prior art by providing an apparatus for and a method of establishing a connection between a source and destination node using multiple parallel paths. To establish a connection, bandwidth capacity on one or more parallel paths are aggregated and combined to form a route having a bandwidth larger than any single path. A technique similar to inverse multiplexing is used at the source end to split the cell stream into multiple parallel paths. At the destination end, the parallel multiple cell streams are inverse demultiplexed and the multiple cell streams combined into a single cell stream.

The parallel routes are established by building parallel VCCs for the same call via the network. The ATM signaling process at the source and destination nodes is modified to accommodate multiple VCCs. In addition, the hardware at each source and destination node is modified to perform the inverse multiplexing and inverse demultiplexing. Furthermore, the control software at the source and destination nodes is modified to implement the call handling required of such a multiple VCC call, including setup, tear down, error handling, etc.

The apparatus and method of the present invention provides a mechanism to route high bandwidth calls that otherwise could not be routed. The invention is applicable wherever multiple parallel paths between the source and destination nodes can be found, including point to multi-point calls that do not have overlapping branches.

There is provided in accordance with the present invention, in an Asynchronous Transfer Mode (ATM) network including a source user, source node, destination user, destination node and a plurality of intermediate nodes, a method of establishing a call from the source user to the destination user, the method comprising the steps of receiving a request to establish a call with a first bandwidth, calculating a plurality of routes from through the intermediate nodes from the source node to the destination node, wherein the maximum available bandwidth on each route calculated is less then the first bandwidth, the aggregate bandwidth of all routes calculated being sufficient to fulfill the first bandwidth of the original call request, establishing the plurality of routes from the source node to the destination node, configuring the source node to convert a serial cell stream to a plurality of parallel cell streams, each parallel cell stream corresponding to a different parallel route from the source node to the destination node, configuring the destination node to convert the plurality of cell streams back to the serial cell stream and forwarding the serial cell stream to the destination user.

The plurality of routes comprising the plurality of intermediate nodes, have one or more shared nodes or one or more shared links. The step of establishing the plurality of routes comprises the step of transmitting a Last Connection Indication (LCI) to indicate whether a particular route is the first, intermediate or last connection of the call and/or transmitting a Network Connection Correlation Identifier (NCCI) to identify the plurality of routes as belonging to a single call.

Each route calculated during the route calculation step, comprises a route not previously used having a maximum bandwidth. The method further comprises the step of generating a call object on the destination node and storing the call object in a data structure, which comprises, for example, a hash list or a trie tree.

In addition, the method further comprises the step of releasing all parallel paths by all nodes common to the plurality of routes, in the event there is release of one parallel connection from among the plurality of parallel connections, and sending a release message to the source user once the last path connection is freed.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CBR | Constant Bit Rate |
| CCITT | Comite Consulatif International Telegraphique et Telephonique |
| DS | Database Summary |
| FDDI | Fiber Distributed Data Interface |
| FIFO | First In First Out |
| FSM | Finite State Machine |
| IISP | Interim Inter-Switch Signaling Protocol |
| ITU | International Telecommunications Union |
| LCI | Last Connection Indicator |
| NCCI | Network Connection Correlation Identifier |
| OC | Optical Carrier |
| PNNI | Private Network to Network Interface |
| PTSE | PNNI Topology State Element |
| PTSP | PNNI Topology State Packet |
| RCC | Routing Control Channel |
| UNI | User to Network Interface |
| VCC | Virtual Channel Connection |

General Description

The present invention overcomes the disadvantages of the prior art by providing an apparatus for and a method of establishing a connection between a source and destination node using multiple parallel paths. To establish a connection, bandwidth capacity on one or more parallel paths are aggregated and combined to form a route having a bandwidth larger than any single path. A technique similar to inverse multiplexing is used at the source end to split the cell stream into multiple parallel paths. At the destination end, the parallel multiple cell streams are inverse demultiplexed and the multiple cell streams combined into a single cell stream.

The parallel routes are established by building parallel VCCs for the same call via the network. The ATM signaling process at the source and destination nodes is modified to accommodate multiple VCCs. In addition, the hardware at each source and destination node is modified to perform the inverse multiplexing and inverse demultiplexing. Furthermore, the control software at the source and destination nodes is modified to implement the call handling required of such a multiple VCC call, including setup, tear down, error handling, etc., It is common today for the routing in ATM to be performed using PNNI source routing. Therefore, the description presented herein uses PNNI routing as an illustrative example. Note, however, that one skilled in the networking [art] arts can apply the apparatus and method of the present invention to other types of networks and/or to other types of routing techniques/protocols as well. The use of PNNI routing as an example is not meant to limit the application of the invention to other routing schemes and networks. The invention is applicable to other types of network and routing schemes where there is a way to insure parallel routes between two users (not counting the ingress and egress nodes).

It is important to note that it is not necessary that the parallel routes be mutually exclusive. The routes selected for the call may share nodes and links as long as there is sufficient bandwidth. Note also that it is not necessary that the intermediate nodes along the parallel routes implement the present invention. The intermediate nodes can be standard ATM nodes as long they utilize the 'pass along' feature of ATM UNI Signaling Specification Version 4.0.

As an example, consider the network 10 shown in FIG. 1 described previously in the Background Section of this document. The source end station 12 is connected to the source edge node via a Gigabit Ethernet connection 22. The destination end station 20 is connected to the destination edge node via a Gigabit Ethernet connection 26. In addition, the maximum bandwidth available on each of the three paths connecting the source and destination end nodes is 155 Mbps.

When the source requests a call with a bandwidth greater then 155 Mbps, the bandwidth of two or more of the paths are aggregated together to form a virtual single link matching the requested bandwidth. The source edge node 14 performs multiple route calculations to find a sufficient number of paths to fulfill the bandwidth request. Once the paths are found, hardware in the source edge node 14 and the destination edge node 18 performs the serial to parallel and the parallel to serial conversions. The setup and operation of the multiple VCC route is transparent to the source end station 12 and the destination end station 20.

Source Node Method

Figure 2A:
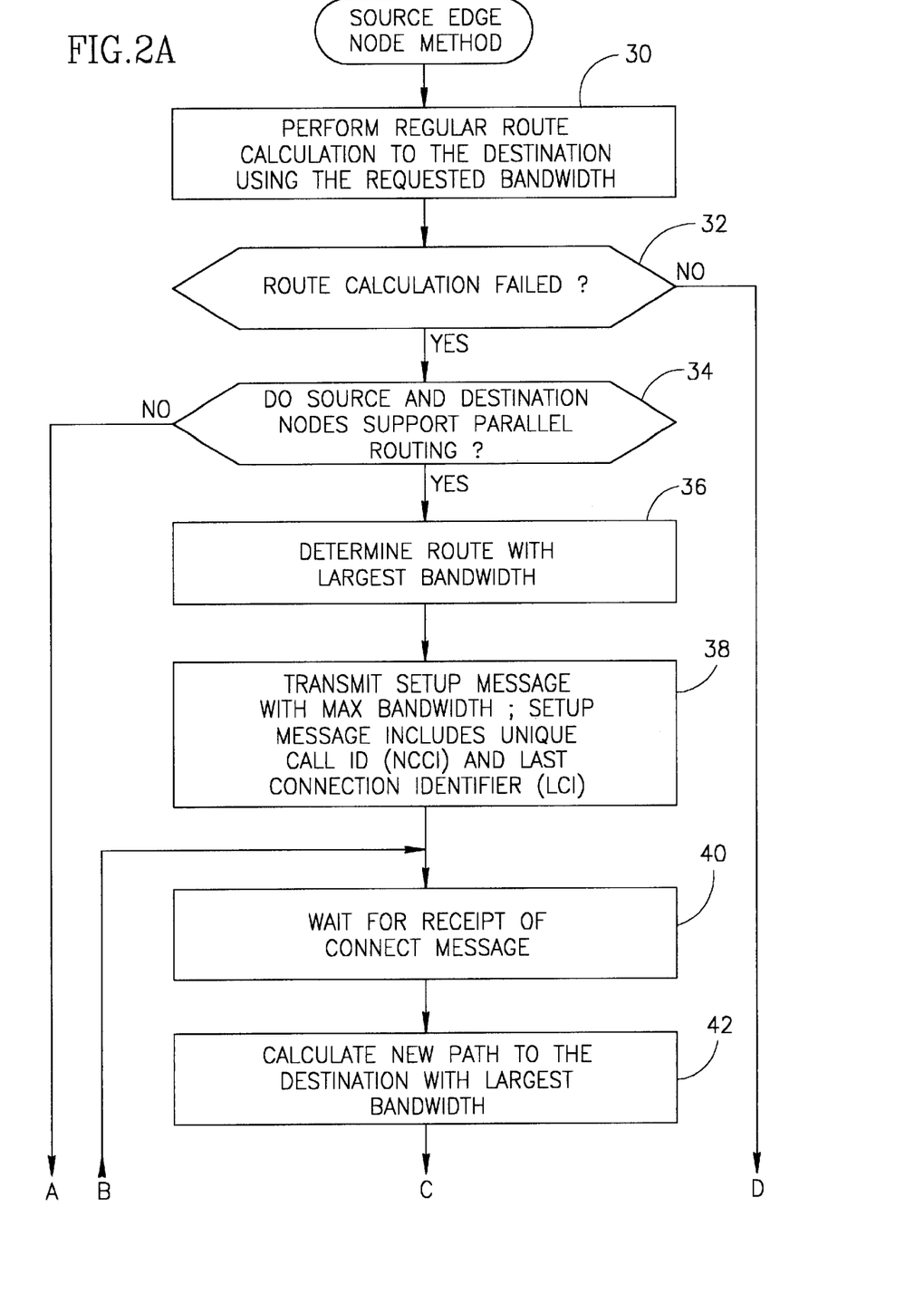
FIGS. 2A and 2B are flow diagrams illustrating the source edge node portion of the parallel routing method of the present invention.
Figure 2B:
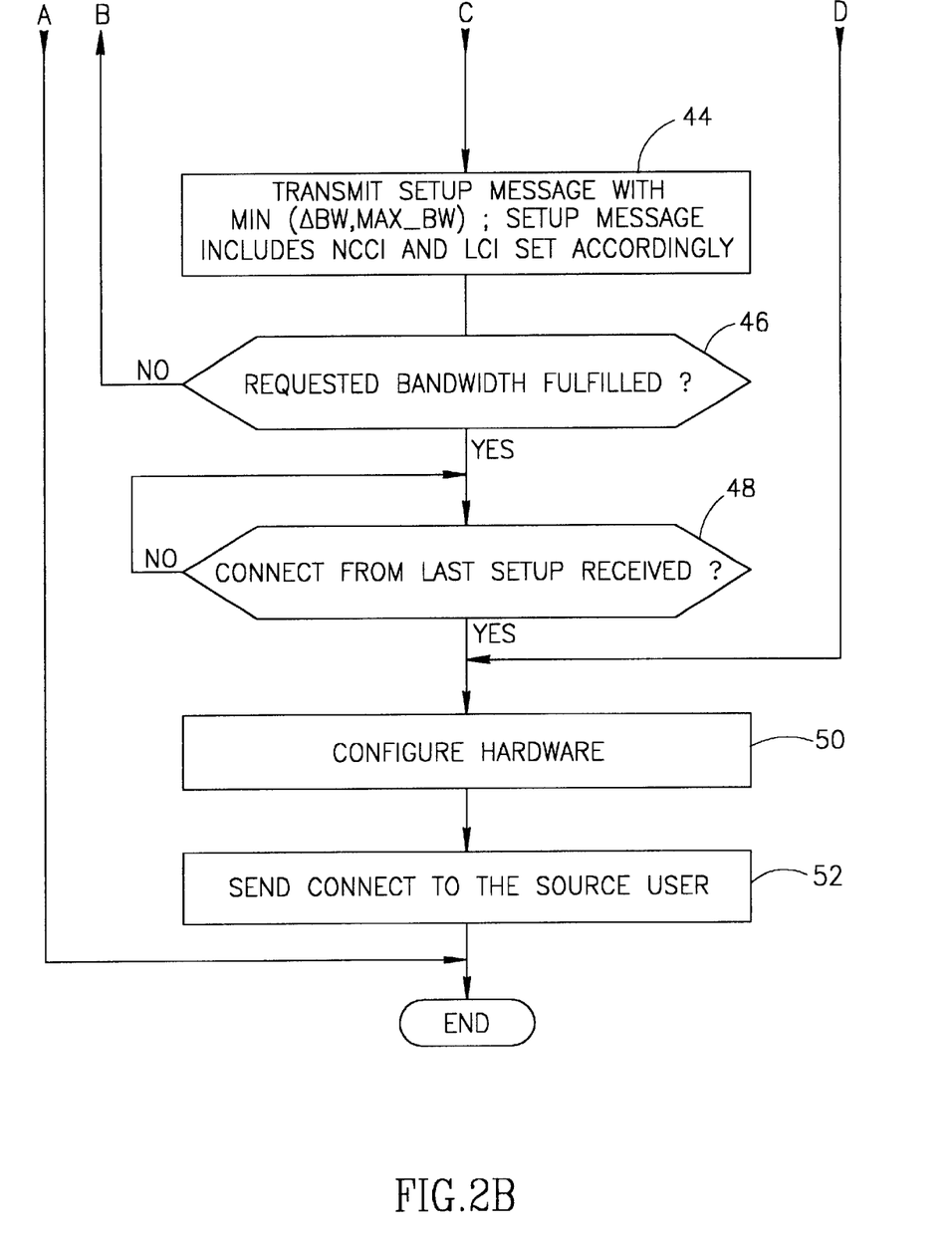

The method performed at the source edge node will now be described in more detail. A flow diagram illustrating the source edge node portion of the parallel routing method of the present invention is shown in FIGS. 2A and 2B. The originating entity is the source edge device which, in this example, comprises a Gigabit Ethernet/ATM interface attached to the source edge node. The application running on the source end station 12 requests a call setup with a particular bandwidth (similar to a CBR call). The edge device receives the request and generates a SETUP message which is sent to the source edge node. The method described below is performed on the source edge node once the request is received from the edge device.

The first step is for the source node to perform a regular route calculation to the destination in response to the SETUP request using the requested bandwidth as a routing constraint (step 30). If the route calculation succeeded (step 32), a CONNECT message is sent to the source user, i.e., the source end station (step 56). In this case, a route was found that met the bandwidth constraint of the requested call. Bandwidth does not need to be aggregated and the call proceeds as a regular call.

If the route calculation to the destination failed (step 32) due to 'Cell Rate Unavailable,' the method of the present invention is used Lo find multiple VCCs from the source to the destination and aggregate them together to form a single connection.

It is first determined whether the source node and the destination nodes support the apparatus and method of the present invention (step 34). The source node looks in the topology database, i.e., the PNNI routing topology, to determine whether the source and the destination node support the multiple parallel VCC routing feature. The destination node is found in the database using the well-known best match technique. Nodal information related to the parallel routing feature of the invention can be stored in the topology database in one or two ways. In one way, the information can be stored as a separate special PTSE created to convey information about this capability of a node. In the second, the information can be indicated as a capability flag within the nodal information portion of one or more standard PTSEs for a node.

If both source and destination nodes do not support the feature, the method terminates as a route cannot be found and the SETUP request fails with an error indication of 'Cell Rate Unavailable.' If both source and destination nodes do support the feature, the route with the largest bandwidth is calculated (step 36). This can easily be done in PNNI when performing a 'best effort' route calculation while optimizing on bandwidth. In this case, if there is connectivity to the destination, then the routing calculation will find a path with the largest bandwidth.

Once the route With the largest bandwidth is found, a SETUP message is sent specifying the maximum bandwidth of the route just calculated (step 38). This bandwidth is termed $BW_1$. The bandwidth originally requested by the user is represented as $BW_{ORIG}$. The SETUP message also comprises other parameters including a unique indication of the call and a Last Connection Identifier (LCI). The unique identification of the call is preferably global within the PNNI routing domain. An example of a unique identification that: can be used is the global Network Connection Correlation Identifier (NCCI) parameter that is part of the PNNI Version 2.0 standard. The NCCI is assigned by the source node to identify calls within the network. Note that there can be more than one route that is assigned the same NCCI parameter.

The Last Connection Identifier (LCI) is assigned by the originating edge node and is also sent in the SETUP message. It functions to indicate whether the associated route is the final connection that is used to construct the total call. The values for the LCI include: 'first', 'intermediate' or 'last' route connection indications. Since this is the first route for the call, the LCI parameter is set to 'first'.

Once the SETUP message is sent, the source node waits for the receipt of a CONNECT message reply (step 40). Once received, the following steps are repeated until the bandwidth request is fulfilled or the routing fails for lack of routes with sufficient bandwidth. A second route with the largest bandwidth is calculated (step 42). Note that it is not a constraint that the routes be mutually exclusive. The routes calculated can have shared nodes and links as long as sufficient bandwidth is available. The bandwidth of the new route just determined is represented as $BW_2$.

A new SETUP message is sent to the destination using the newly calculated route (step 50). The bandwidth requested in the SETUP message is determined using Equation 1 below.

$$\text{Requested } BW = MIN[(BW_{ORIG} - BW_1), BW_2] \qquad (1)$$

In accordance with Equation 1, the minimum of the remaining requested bandwidth and the bandwidth available in the route just calculated is sent in the SETUP message. In addition to the requested bandwidth, the global NCCI parameter for the call is sent along with the LCI. If this is the final connection for the call, then the LCI parameter is set to 'last'. Otherwise it is set to 'intermediate'.

If the route just calculated is not the last connection required to fulfill the bandwidth request (step 46), than the method repeats with steps 40, 42, 44, 46. Additional routes are calculated until the original bandwidth request is fulfilled.

The maximum bandwidth of the $i^{th}$ route is represented as $BW_i$ and Equation 1 can be expressed for any $i^{th}$ iteration as follows.

$$\text{Requested } BW \text{ for } i^{th} \text{ iteration} = \text{MIN}\left[\left(BW_{ORIG} - \sum_{1}^{i-1} BW_j\right), BW_i\right] \quad (2)$$

The bandwidth is the minimum of the remaining bandwidth to be setup, which is the original bandwidth minus the sum of the bandwidths already routed, and the bandwidth of the route being considered.

If at any point, the route calculation fails during an iteration, the connections previously established are released using standard ATM signaling procedures. When this happens, the call cannot be made and the source node signals an error message to the end station.

Once the last route calculation is performed, the source node waits for the CONNECT to be received corresponding to the final SETUP message (step 48). Once the CONNECT is received, the hardware in the source node is configured to inverse multiplex the output bound cell stream into multiple parallel VCC streams (step 50). Once the hardware in the source node is configured, a CONNECT message is sent to the source user (step 52).

Note that once the call is established, either the source user or the destination user may free the call, or one of the connections along the multiple routes may fail. In either case, all the connections must be freed using normal ATM signaling procedures.

Note also, that it is not necessary that the intermediate nodes along the path support the multiple parallel routing feature of the present invention. If an intermediate node does not support the feature, than it must be able to -pass the signaling parameters to the next node in the path in transparent fashion. This can be achieved if the node supports the pass along feature of the ATM UNI Signaling Specification Version 4.0.

Destination Node Method

Figure 3A:
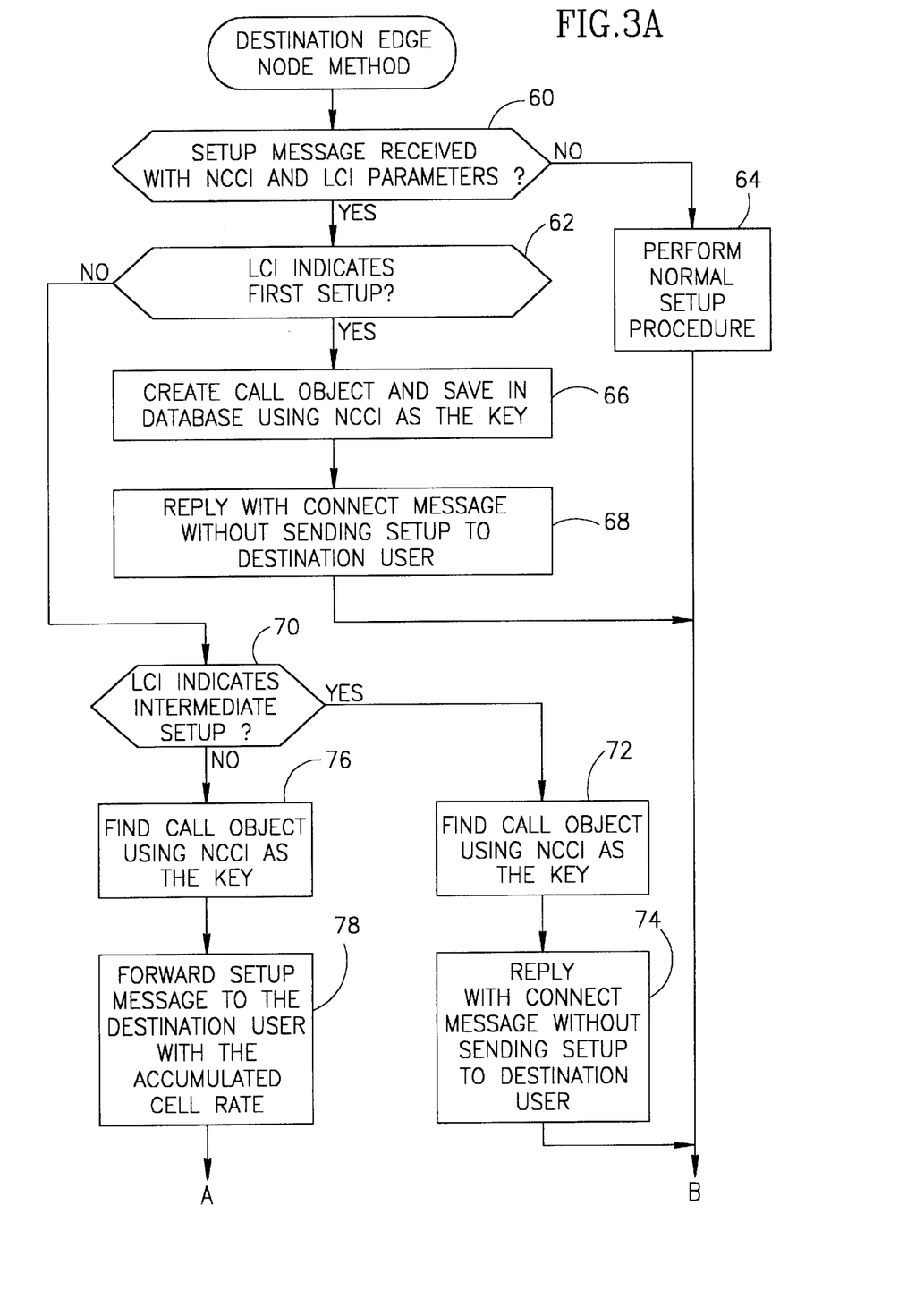
FIGS. 3A and 3B are flow diagrams illustrating the destination edge node portion of the parallel routing method of the present invention.
Figure 3B:
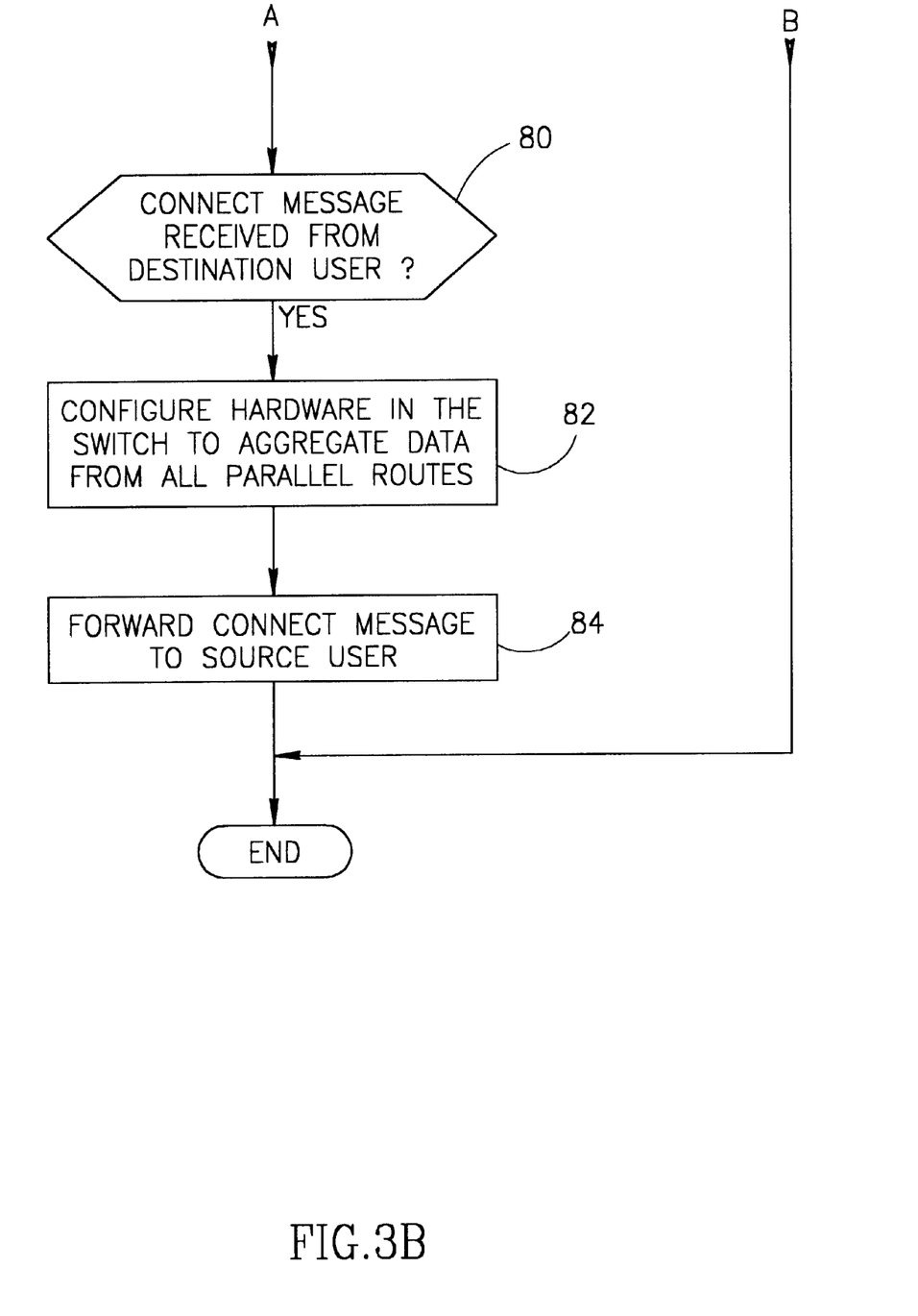

A flow diagram illustrating the destination edge node portion of the parallel routing method of the present invention is shown in FIGS. 3A and 3B. As described previously, both the destination node and the source node are required to support the multiple VCC call establishment method of the present invention.

When a SETUP message is received by the destination node, the following method is performed. First, it is determined whether the SETUP message was received with NCCI and LCI parameters (step 60). If not, then the SETUP message does not correspond to a multiple VCC call and the destination node proceeds with the normal setup procedure (step 64).

If NCCI and LCI parameters were received with the SETUP message, then the node examines the LCI parameter to see if it indicates 'first' (step 62). If the LCI indicates a first route connection, then the destination node creates a call object that holds data about the call for use when additional parallel VCCs are routed to the node (step 66). The call object created is stored in a database which preferably provides fast access to the data. The data is stored using the NCCI parameter as the key so as to be able to find the object quickly during a subsequent search. Fast access to the data is important as a single original call may be established using a large number of parallel VCCs. The call cannot be established until all of the parallel VCCs are in place. The fast access database may comprise a hash list or a trie tree, both structures being well known in the computer software arts.

The destination node then replies with a CONNECT message but does not relay the SETUP message to the destination user (step 68). The method then terminates until the next SETUP message is received that corresponds to the next parallel VCC.

If the LCI does not indicate a 'first' connection, it is checked whether it indicates an 'intermediate' connection (step 70). If it does so indicate, than the destination node performs a search in its database for the call object using the NCCI parameter in the SETUP message as the key (step 72). Once the call object is found, the node replies with a CONNECT message but does not relay the SETUP message to the destination user (step 74). The method then terminates until the next SETUP message is received that corresponds to the next parallel VCC.

If the LCI does not indicate an 'intermediate' connection, then it must indicate a 'last' connection, i.e., this SETUP message is for the last route connection (step 70). In this case, the destination node searches for the call object in its database using the NCCI parameter in the SETUP message as the key (step 76). Once found, the node forwards the SETUP message to the destination user with the accumulated cell rate (step 78). The accumulated cell rate is the aggregate cell rate of the entire call to be established, i.e., the sum of the cell rates of all parallel VCC routes.

The destination user replies with a CONNECT message which is received by the destination node (step 80). Once the CONNECT is received, the destination node configures its hardware to aggregate the cell streams on multiple VCC routes into a consolidated cell stream (step 82). Once this is performed, a CONNECT message is forwarded to the source user (step 84).

Node Hardware

Figure 4:
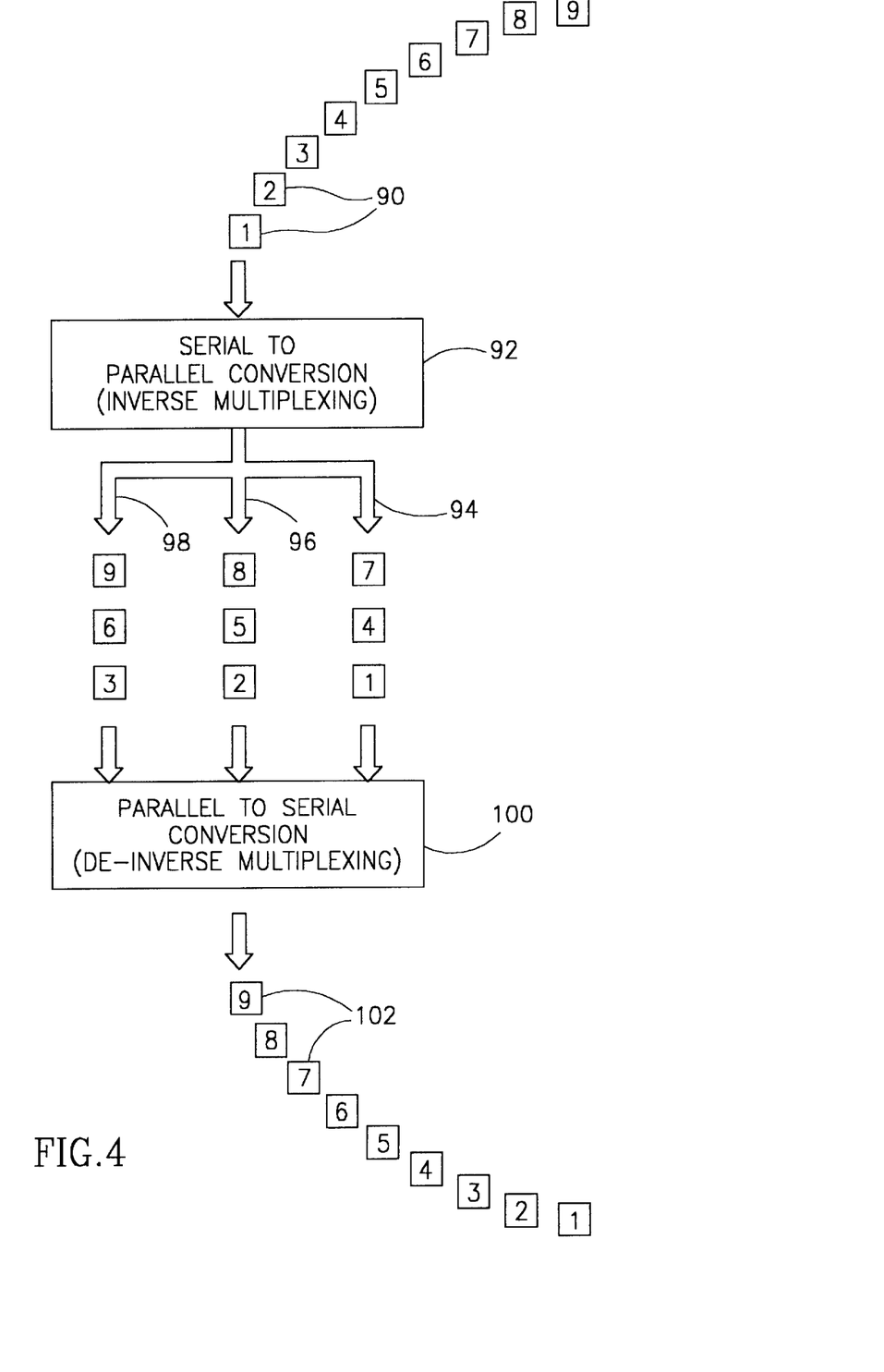
FIG. 4 is a diagram illustrating the inverse multiplexing and inverse demultiplexing performed at the source and destination nodes.

A diagram illustrating the inverse multiplexing and inverse demultiplexing performed at the source and destination nodes is shown in FIG. 4. The functionality of the hardware that is implemented includes transferring cells from serial to parallel and vice versa. At the source node, the hardware is configured to convert a serial cell stream 90 into a plurality of parallel cell streams via a serial to parallel converter 92. The serial to parallel converter 92 functions as an inverse multiplexor breaking up a single high bit rate cell stream into multiple lower bit rate cell streams. The example ATM network shown in FIG. 1 is used to illustrate the invention. The three routes are represented as three cell streams 94, 96, 98 that are generated by the serial to parallel converter 92.

At the other end of the routes, the three cell streams are input to the parallel to serial converter 100 which performs inverse demultiplexing. The three separate cell streams are consolidated and reunited to form a single high bit cell stream 102.

It is important to note that the cells arriving from the host at the source node are preferably tagged with a serial number and transmitted in round robin fashion between all the parallel paths making up the complete call. At the destination node, one or more cells may arrive out of order. In this case, they are stored in a buffer, e.g., FIFO, etc., until either the missing cell arrives or the buffer fills up. Once the missing cell arrives or the buffer fills, the cells in the buffer are read out. If the buffer fills, any missing cells are treated as lost cells.

Note that the control procedures to handle the release of a multiple parallel route call are substantially the same as those required for an ordinary call. One difference, however, is that when one of the parallel connections in a multiple connection call is released, the nodes that are common to all the parallel paths, i.e., attached to the source and destination nodes, must free all the other parallel paths too. Once the last parallel connection has been released, a RELEASE message is sent to the source user.

Figure 5:
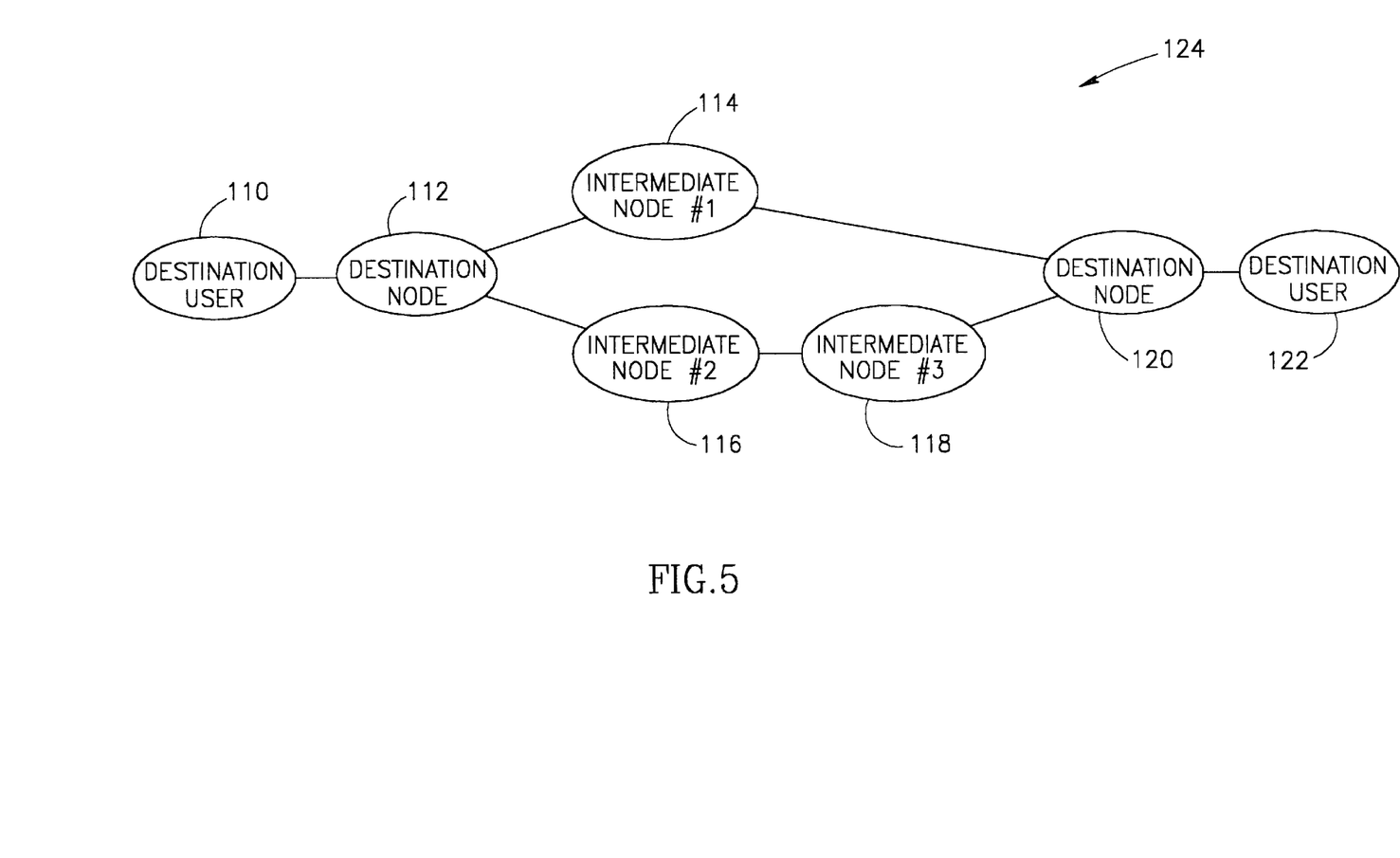
FIG. 5 is a block diagram illustrating an ATM network used to illustrate the principles of the preset invention.

A block diagram illustrating an ATM network used to illustrate the principles of the preset invention is shown in FIG. 5. The example ATM network, generally referenced 124, comprises a source user 110, source node 112, destination user 122 and destination node 120. The source node 112 is connected to the destination node 120 via two parallel paths. The upper path comprises intermediate node #1 114 and the lower path comprises intermediate node #2 116 and intermediate node #3 118.

In this example, both paths are used to establish a connection from the source to the destination using the multiple VCC call established method of the present invention. In response to the SETUP message received by the source node, the requested bandwidth is achieved by consolidating the bandwidths available on both upper and lower paths. A description of the transactions and message flow between the network elements in the network 124 will now be described in more detail.

Figure 6:
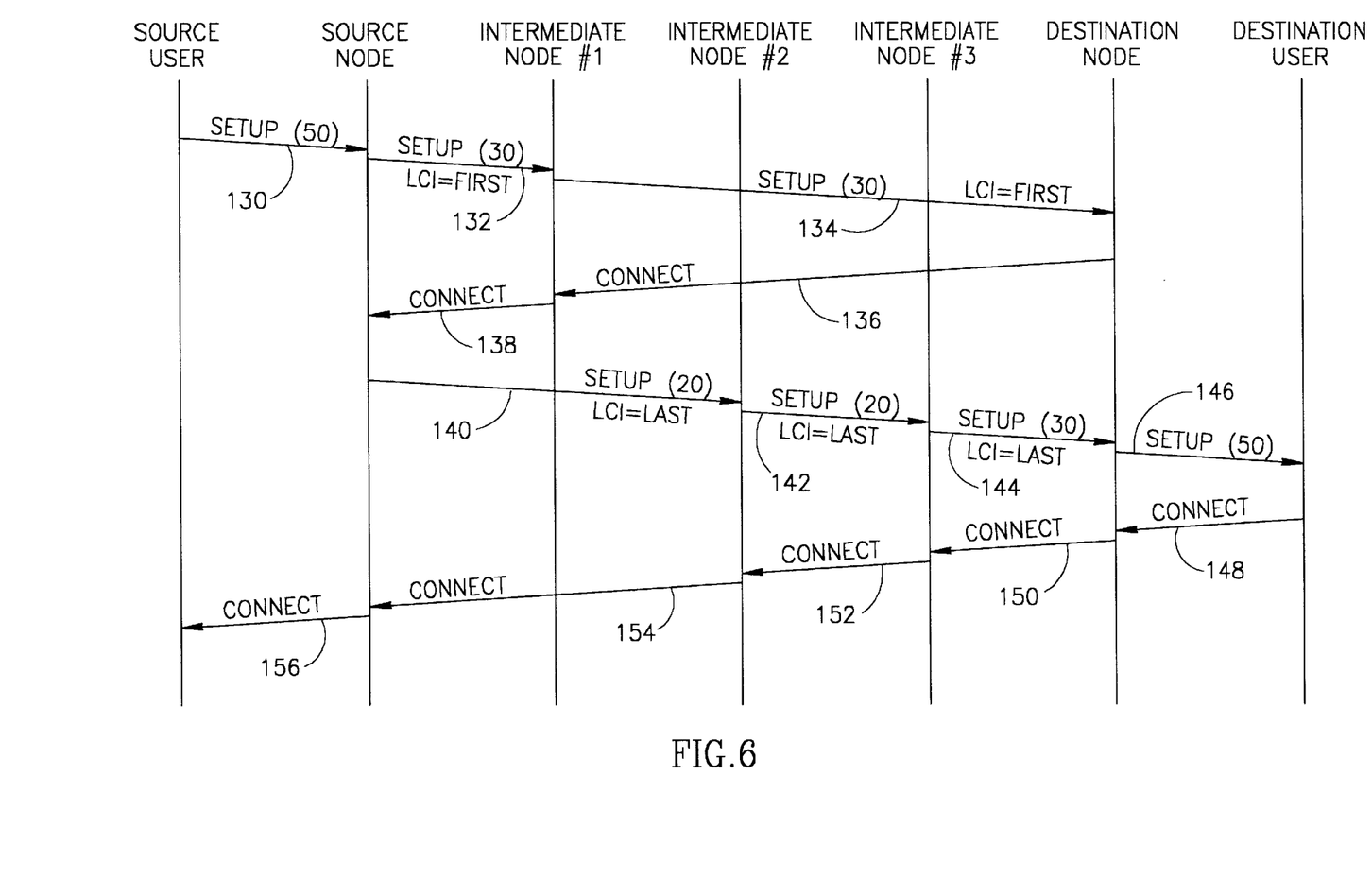
FIG. 6 is a diagram illustrating the message sequence between each network element in the ATM network of FIG. 5.

A diagram illustrating the message sequence between each network element in the ATM network of FIG. 5 is shown in FIG. 6. In this example, assume that the destination user wishes to set up a call with a bandwidth of 50 Mbps. The upper path only has 30 Mbps available and the lower path has only 20 Mbps available. Thus, there is no single path that can support the requested bandwidth. Therefore, the apparatus and method of the present invention is required to establish the call.

Initially, the source user generates a SETUP message indicating 50 Mbps bandwidth requested and sends it to the source node (referenced 130). Upon receiving the message, the source node first attempts to find a single route with the requested bandwidth. None is found and, in accordance with the present invention, the source calculates a first route connection with the maximum bandwidth available. It sends a SETUP message to the intermediate node #1 with the NCCI parameter, LCI set to 'first' and 30 Mbps requested bandwidth (referenced 132).

The intermediate node #1 simply passes the SETUP message along to the destination node with NCCI parameter, LCI set to 'first' and 30 Mbps requested bandwidth (referenced 134). In accordance with the invention, the destination node creates a call object, stores the relevant data in the call object which is stored in a database, and replies with a CONNECT message (referenced 136). Intermediate node #1 forwards the CONNECT message to the source node (reference 138).

The source node, upon receiving the CONNECT message, performs a second route calculation, yielding the lower path for routing next. A SETUP message is generated and sent to the intermediate node #2 with the same NCCI parameter, LCI set to 'last' and requested bandwidth set to 20 Mbps (referenced 140). The LCI indication is set to 'last' since the bandwidth available on the lower path fulfills the remaining 20 Mbps bandwidth deficit.

Intermediate node #2 receives the SETUP message and forwards it to intermediate node #3 (referenced 142). Intermediate node #3 forwards the SETUP message to the destination node (referenced 144). The destination node, in response to the LCI being set to 'last', configures its hardware to handle the parallel to serial conversion of the cell stream from the two parallel paths to generate a single cell stream. The destination node then forwards the SETUP message to the destination user with the total cell rate of 50 Mbps (referenced 146).

The destination user replies with a CONNECT message to the destination node (referenced 148). The CONNECT message is forwarded to intermediate node #3 (referenced 150) and then to intermediate node #2 (referenced 152). Intermediate node #2 then forwards it to the source node (referenced 154). Upon receiving the CONNECT message, the destination node configures its hardware to perform the serial to parallel conversion of the cell stream into multiple paths and subsequently forwards the CONNECT message to the source user (referenced 156).

While the invention has been described with respect to a limited number of embodiments, it will be appreciated that many variations, modifications and other applications of the invention may be made.

What is claimed is:

1. In an Asynchronous Transfer Mode (ATM) network including a source user, source node, destination user, destination node and a plurality of intermediate nodes, a method of establishing a call from said source user to said destination user, said method comprising the steps of:

receiving a request to establish a call with a requested bandwidth;

if a route with said requested bandwidth cannot be found, calculating and establishing a plurality of parallel routes via said plurality of intermediate nodes from said source node to said destination node, wherein a call indication is sent to said destination node in the establishment of each parallel route indicating whether a route is a final route used to establish said call;

configuring said source node to convert a serial cell stream to a plurality of parallel cell streams, each parallel cell stream corresponding to a different parallel route established between said source node and said destination node;

configuring said destination node to convert said plurality of cell streams back to said serial cell stream; and forwarding said serial cell stream to said destination user.

2. The method according to claim 1, wherein said plurality of routes comprising said plurality of intermediate nodes, have one or more shared nodes.

3. The method according to claim 1, wherein said plurality of routes comprising said plurality of intermediate nodes, have one or more shared links.

4. The method according to claim 1, wherein said step of establishing said plurality of routes comprises the step of transmitting a Last Connection Indication (LCI) to indicate whether a particular route is the first, intermediate or last connection of the call.

5. The method according to claim 1, wherein said step of establishing said plurality of routes comprises the step of transmitting a Network Connection Correlation Identifier (NCCI) to identify said plurality of routes as belonging to a single call.

6. The method according to claim 1, wherein said each route calculated during said route calculation step, comprises a route not previously used having a maximum bandwidth.

7. The method according to claim 1, further comprising the step of generating a call object on said destination node and storing said call object in a data structure.

8. The method according to claim 7, wherein said data structure comprises a hash list.

9. The method according to claim 7, wherein said data structure comprises a trie tree.

10. The method according to claim 1, further comprising the step of releasing all parallel paths by all nodes common to said plurality of routes, in the event there is release of one parallel connection from among said plurality of parallel connections, and sending a release message to said source user once the last path connection is freed.

11. The method according to claim 1, wherein said call indication is adapted to indicate whether a parallel route is a first, intermediate or final route of said call, an indication of a final route causing said destination node to complete said call and forward a SETUP message to said destination user with an indication of the aggregate bandwidth of said parallel routes.

12. A method for use in an Asynchronous Transfer Mode (ATM) source node of establishing a call to a destination utilizing multiple parallel routes, said method comprising the steps of:

performing a first route calculation,to said destination in accordance with a requested bandwidth received in a SETUP message from a source user;

if said first route calculation fails, determining a second route to said destination having the largest bandwidth from among available routes and transmitting a SETUP message adapted to include a unique call identification and a call indication, said call indication adapted to indicate whether a particular route is a final route;

if the establishment of said second route is successful, determining and establishing additional routes from said source node to said destination until the aggregate bandwidth of all routes established meet or exceed said requested bandwidth; and configuring said source node for inverse multiplexing of an input cell stream over said parallel routes.

13. The method according to claim 12, wherein if the establishment of said first route is successful, sending a CONNECT message said source user.

14. The method according to claim 12, said second routes are not necessarily mutually exclusive.

15. The method according to claim 12, wherein upon successful establishment of said final route, sending a CONNECT message to said source user that includes the aggregate bandwidth of all said second routes.

16. The method according to claim 12, wherein said unique call identification comprises a Network Connection Correlation Identifier (NCCI).

17. A method for use in an Asynchronous Transfer Mode (ATM) destination node of establishing a call between a source node and said destination node utilizing multiple parallel routes, said method comprising the steps of:

receiving a SETUP message transmitted by said source node containing a request to establish a multiple route call,said request comprising a call identification and a last call indication;

if said last call indication indicates a first route, establishing a call object for storing call related data and replying to said source node with a CONNECT message in response thereto;

if said last call indication indicates an intermediate route and said call identification corresponds to that found in an associated call object, replying to said source node with a CONNECT message;

if said last call indication indicates a final route and said call identification corresponds to that found in an associated call object, forwarding a SETUP message to a destination user containing the aggregate cell bandwidth of said call; and upon receipt of a CONNECT message from said destination user, configuring said destination node for inverse demultiplexing of a cell stream and forwarding a CONNECT message to said source node.

18. The method according to claim 17, said routes are not necessarily mutually exclusive.

19. The method according to claim 17, wherein said routes comprise one or more shared nodes.

20. The method according to claim 17, wherein said call identification comprises a Network Connection Correlation Identifier (NCCI).

* * * * *